US006227435B1

(12) United States Patent
Lazarz et al.

(10) Patent No.: US 6,227,435 B1
(45) Date of Patent: May 8, 2001

(54) METHOD TO PROVIDE A SMOOTH PAINTABLE SURFACE AFTER ALUMINUM JOINING

(75) Inventors: Kimberly Ann Lazarz, Ann Arbor; Matthew John Zaluzec, Canton, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/497,056

(22) Filed: Feb. 2, 2000

(51) Int. Cl.[7] .............................. B23K 31/10; C23C 6/00

(52) U.S. Cl. .......................... 228/125; 228/254; 228/261; 427/456; 219/118

(58) Field of Search .................................... 228/125, 151, 228/254, 261; 219/118; 29/527.2; 427/455, 456, 328

(56) References Cited

U.S. PATENT DOCUMENTS

| | | | |
|---|---|---|---|
| 4,115,974 | | 9/1978 | Purcell . |
| 4,510,171 | * | 4/1985 | Siebert . |
| 4,526,839 | | 7/1985 | Herman et al. . |
| 4,541,480 | * | 9/1985 | Beckmann . |
| 4,578,114 | | 3/1986 | Rangaswamy et al. . |
| 4,578,115 | | 3/1986 | Harrington et al. . |
| 4,725,508 | | 2/1988 | Rangaswamy et al. . |
| 4,791,765 | | 12/1988 | Noggle . |
| 4,883,703 | | 11/1989 | Riccio et al. . |
| 5,079,822 | | 1/1992 | Arai et al. . |
| 5,268,045 | | 12/1993 | Clare . |
| 5,271,967 | | 12/1993 | Kramer et al. . |
| 5,380,564 | | 1/1995 | VanKuiken, Jr. et al. . |
| 5,434,210 | | 7/1995 | Rangaswamy et al. . |
| 5,439,714 | | 8/1995 | Mori et al. . |
| 5,468,295 | | 11/1995 | Marantz et al. . |
| 5,481,084 | * | 1/1996 | Patrick et al. . |
| 5,520,334 | | 5/1996 | White . |
| 5,526,977 | | 6/1996 | Wei . |
| 5,535,841 | | 7/1996 | Cobes, Jr. et al. . |
| 5,594,930 | | 1/1997 | Terada et al. . |
| 5,669,436 | | 9/1997 | Papich et al. . |
| 5,723,187 | | 3/1998 | Popoola et al. . |
| 5,746,966 | | 5/1998 | McDonald . |
| 5,820,939 | * | 10/1998 | Popoola et al. . |
| 5,820,940 | * | 10/1998 | Gorynin et al. . |
| 5,885,663 | | 3/1999 | Longo . |
| 5,932,293 | | 8/1999 | Belashchenko et al. . |
| 5,934,745 | | 8/1999 | Moore et al. . |

* cited by examiner

*Primary Examiner*—Patrick Ryan
*Assistant Examiner*—Jonathan Johnson
(74) *Attorney, Agent, or Firm*—Damian Porcari

(57) ABSTRACT

A method of providing a smooth paintable surface after aluminum joining. Two aluminum pieces are welded together to form a joint, and a weld bead is formed at the joint. An aluminum spray filler is applied by thermal spraying on an area around the weld bead, and the area around the weld bead and aluminum spray filler is ground to produce a smooth paintable surface at the joint. The area around the weld bead is preferably roughened prior to spray brazing. The roughening is preferably produced by a process selected from grit blasting, rough sanding, and depositing a flux.

15 Claims, 2 Drawing Sheets

METHOD TO PROVIDE A SMOOTH PAINTABLE SURFACE AFTER ALUMINUM JOINING

BACKGROUND OF THE INVENTION

The need to reduce vehicle weight to achieve better fuel economy has lead to an increase in the use of aluminum in the structural and exterior components of vehicles. As a result, new processes must be developed which reflect the different material properties of aluminum and which will allow aluminum parts to replace steel in various applications.

For example, when two pieces of metal are joined on the exterior of the vehicle, the joint must be disguised so that it is not apparent that there is more than one piece of metal. The so-called seamless joint aluminum body panels are currently processed by welding and then grinding the joint. A Class-A finish can be produced by grinding the weld bead down to produce a smooth paintable surface. This results in significant thinning of the base material. Measurements have shown removal of more than 50 percent of the material, which has serious implications for the integrity of the panel. The material's integrity must be maintained after grinding, or distortions may appear at the joint after the panel is processed through the paint ovens.

One way to avoid the potential for sinking/distortion of the joint is to add extra material in the form of spray filler that produces a paintable Class-A finish. The term thermal spray process describes a group of well-known processes for depositing metallic, non-metallic, and mixed metallic/nonmetallic coatings. These processes all require a heat source, a propelling device, and a feed material. The processes include flame spraying (including combustion flame spray, and high-velocity oxy-fuel (HVOF) thermal spray devices, plasma spraying (including powder plasma spraying, and plasma transferred wire arc deposition), electric arc spraying (including twin wire arc spraying), and detonation spray.

A flame spray device typically deposits metals or ceramics on a substrate. The flame spray device includes a combustion chamber which receives a mixture of fuel and oxidant as a pressurized gas, and creates a combustion reaction in a high pressure, high temperature stream. The flame spray device directs the combustion stream from the combustion chamber to a flow nozzle. The spray material enters the high velocity combustion stream, which melts the spray material at least partially. The combustion stream atomizes the partially (or completely) melted spray material, and sends it toward the surface of the substrate.

A plasma spray device generates and sends out a high velocity, high temperature gas plasma which delivers a powdered or particulate material to the surface of the substrate. The plasma spray device forms the gas plasma by sending a gas through an electric arc in the nozzle of a spray gun, causing the gas to ionize into the plasma stream. The spray material, which can be preheated if desired, is introduced into the plasma stream and directed to the surface of the substrate.

An arc spray device generates an electric arc zone between two consumable wire electrodes. As the electrodes melt, the arc spray device feeds the electrode wires into the arc zone. A compressed gas is delivered into the arc zone where it atomizes the molten surfacing material and propels it to the surface of the substrate.

The arc spray process is currently used in the industry to provide extra material for large steel joints. Silicon bronze is heated and deposited on the roughened surface of the weld component and then sanded to a smooth finish.

However, these thermal spray techniques have not been used on aluminum body panel joints to help achieve a Class-A finish.

New joining methods must be developed that permit aluminum to be used in the difficult joint designs demanded by vehicle styling. A process is needed to produce a Class-A surface when aluminum parts are welded together. The process should allow production of a smooth paintable surface without significant thinning of the base aluminum.

SUMMARY OF THE INVENTION

The present invention solves these needs by providing a method of providing a smooth paintable surface after aluminum joining. Two aluminum pieces are welded together to form a joint, forming a weld bead at the joint. Aluminum spray filler is applied by thermal spraying on an area around the weld bead. The area around the weld bead and aluminum spray filler is then ground to produce a smooth paintable surface at the joint. The area around the weld bead is preferably roughened prior to thermal spraying. The roughening is preferably produced by grit blasting, rough sanding, or depositing a flux suitable for achieving a chemically bonded coating.

The aluminum spray filler can be any 11xx or 4xxx series aluminum alloy, and is preferably 1100, 4047 or 4043 aluminum alloys. In addition, silicon cored wire can be used, with a silicon content up to about 20%. The preferred cored wire is one containing about 20% silicon.

Accordingly, it is an object of the invention to provide a process to produce a smooth paintable surface for welded aluminum parts without significant thinning of the base aluminum.

DETAILED DESCRIPTION OF THE INVENTION

Figure 1:
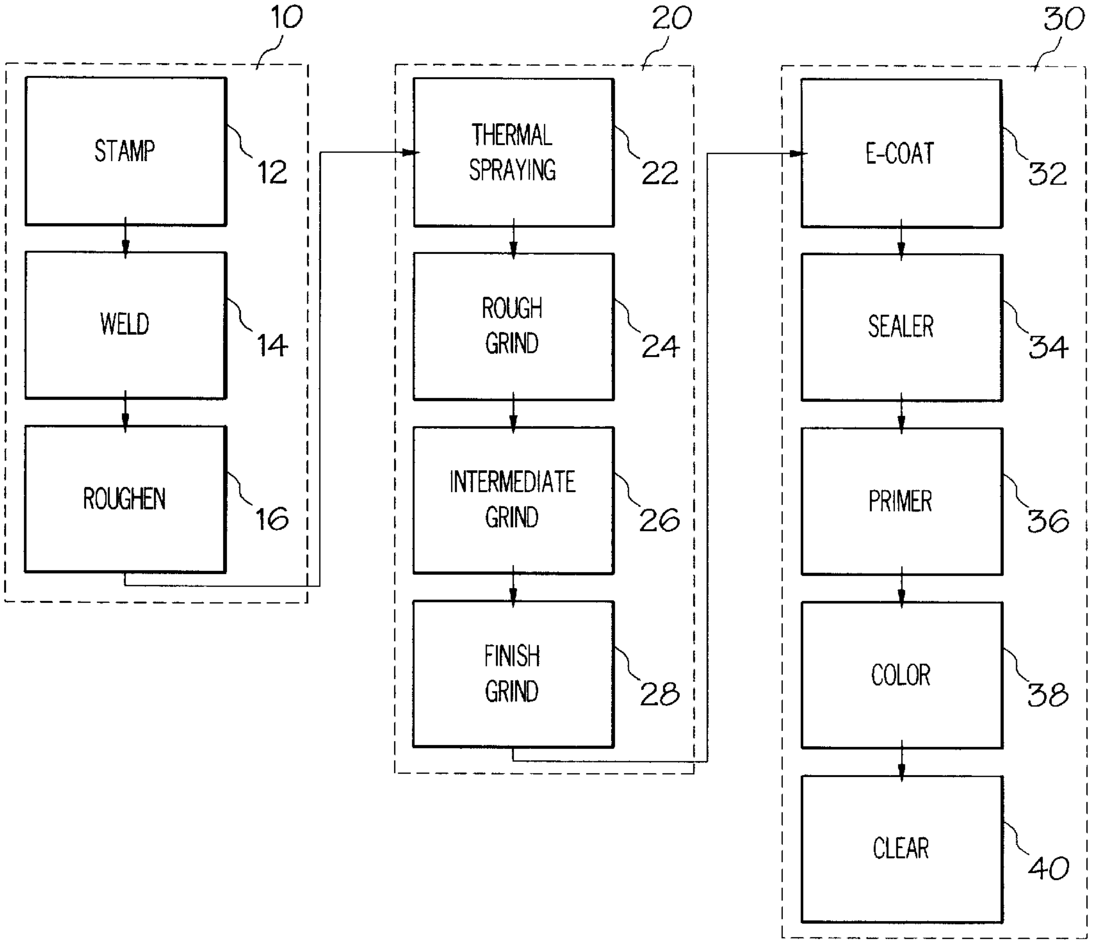
FIG. 1 is a flow chart showing the processes used to produce a Class-A surface finish for a welded aluminum joint.

As shown in FIG. 1, a typical process for producing a Class-A finish involves three basic steps: joining 10, finishing 20, and painting 30. In the joining step 10, the aluminum parts are first stamped out 12. Then they are welded together 14, such as by metal inert gas welding or plasma welding. After welding 14, the surface of the weld optionally can be roughened 16, preferably using processes including grit blasting, rough sanding, or depositing a flux.

After roughening 16, the finishing steps 20 are carried out. An aluminum spray filler is applied by thermal spraying 22. The joint is then subjected to rough grinding 24, intermediate grinding 26, and finish grinding 28. The finish grinding 28 can include one or more finish grinding steps. The term grinding as used herein includes sanding.

The painting step 30 then takes place. First, an E-coat 32 is applied. Next, a sealer, for example, a glaze 34 (DFL 17 Red Cap Spot Putty from PPG Industries Inc., 3800 W. $143^{rd}$ St., Cleveland, Ohio 44111) is applied to cover any paint defects caused by the thermal spraying. The red glaze is sanded after it dries. Then a primer 36 and a color coating 38 are put on, followed by a clear coating 40.

Thermal spraying 22 deposits aluminum spray filler material on the area around the joint. During finishing, when the joint is ground down, the spray filler material is removed instead of the body stock aluminum. By providing this additional material which can be removed during finishing, thermal spraying preserves the structural integrity of the base aluminum.

Figure 2:
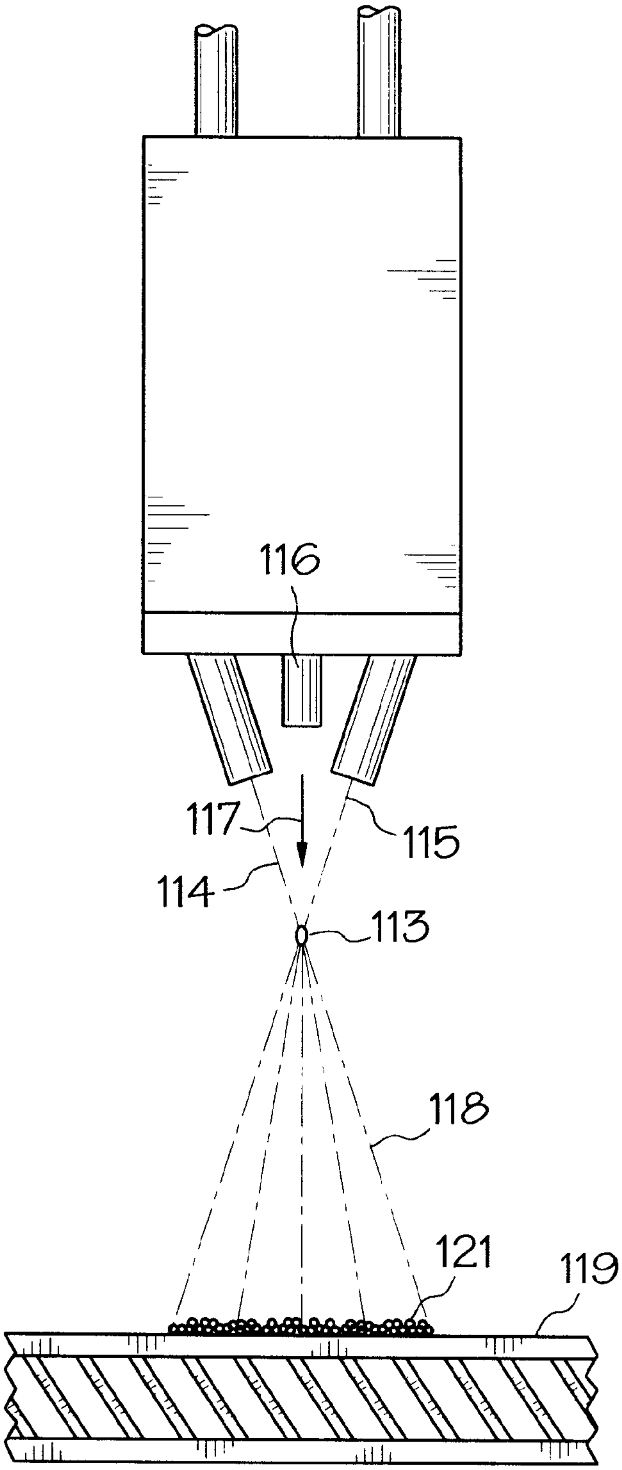
FIG. 2 is a diagram showing thermal spraying using an electric arc process.

FIG. 2 shows an electric arc process for thermal spraying. The electric arc melts the aluminum material. An arc 113 can be struck between two feed wires (i.e., solid wire or cored wire) 114 and 115, which serve as consumable electrodes. The arc continuously melts the ends of the wires. Compressed air is blown from a nozzle 116 along a path 117 behind the arc to atomize and project the molten drop in a conical spray 118 to the substrate or target 119. The molten particles deform on impact and adhere to the substrate forming a coating 121.

Examples of typical operating conditions for the thermal spraying of the present invention include the following: atomizing and arc jet air flow rates—about 70 CFM (cubic feet per minute), volts—about 30, and amps—about 100–200. These conditions are intended to be exemplary only, and not limiting.

Typical coating thicknesses are between 0.010–0.25 inches. A coating of sufficient thickness to render a finished surface representing a seamless joint is acceptable.

The following examples show the operating conditions for two different aluminum filler materials.

EXAMPLE 1

The thermal spray device was a Model 8850 made by Hobart Tafa Technologies, 146 Pembroke Road, Concord, N.H. 03301. The aluminum filler material was a 4043 wire. The surface was prepared by grit blasting the weld steel grit at 20 psi.

| | |
|---|---|
| Stand off | 4 inches |
| Atomizing Air | 70 CFM |
| Arc Jet Air | 70 CFM |
| Amps | 150 |
| Volts | 30 |

EXAMPLE 2

In this example, a 20% silicon cored wire was used as the aluminum filler material. The surface was prepared by grit blasting the weld steel grit at 20 psi.

| | |
|---|---|
| Stand off | 4 inches |
| Atomizing Air | 75 CFM |
| Arc Jet Air | 60 CFM |
| Amps | 100–200 |
| Volts | 27 |

The proper mix of alloying elements determines grindability and ease of finishing. The aluminum filler material is preferably a low unalloyed aluminum, such as the 11xx series aluminum, or an aluminum silicon alloy, such as the 4xxx series aluminum alloys. The aluminum filler material can either be a solid wire or a cored wired. When a solid wire is used, the upper limit of silicon content is about 12%, the eutectic level. One preferred aluminum filler material is 1100 aluminum, which was the easiest material to grind.

The 4xxx family of alloys is comprised mainly of aluminum and about 1 to 12% silicon. The preferred 4xxx materials are the 4047 and 4043 alloys. These materials provide good results because they have a high silicon content and low porosity. The high silicon content allows proper adhesion of the thermal spray to the aluminum joint. It also provides easier finishing due to the presence of the silicon particles that enhance grinding and allow the finishing paper to last longer. In addition, because it has a lower melting temperature than the base metal, it will not distort the metal as it is applied.

Cored wire can also be used as the aluminum filler material in thermal spraying. In a cored wire, the outside of the wire is aluminum, such as 3003 aluminum, and there is a core of silicon powder in the middle of the wire. Cored wire can have a silicon content of up to about 20%. Silicon cored wires having silicon levels up to about 20% are preferred aluminum filler materials, with the 20% silicon cored wire being preferred.

While certain representative embodiments and details have been shown for purposes of illustrating the invention, it will be apparent to those skilled in the art that various changes in the compositions and methods disclosed herein may be made without departing from the scope of the invention, which is defined in the appended claims.

What is claimed is:

1. A method of providing a smooth paintable surface after aluminum joining comprising:

welding two aluminum pieces together to form a joint, a weld bead being formed at the joint;

thermal spraying an aluminum spray filler on an area around the weld bead; and grinding the area around the weld bead and aluminum spray filler to produce a smooth paintable surface at the joint.

2. The method of claim 1 further comprising roughening an area around the weld bead prior to spray brazing.

3. The method of claim 2 wherein the area around the weld bead is roughened by a process selected from grit blasting, rough sanding, and depositing a flux.

4. The method of claim 1 wherein the aluminum spray filler comprises a solid wire containing up to about 12% silicon.

5. The method of claim 1 wherein the aluminum spray filler comprises an 11xx or 4xxx series aluminum alloy.

6. The method of claim 1 wherein the aluminum spray filler is selected from 1100, 4047, and 4043 aluminum alloys.

7. The method of claim 1 wherein the aluminum spray filler comprises a silicon cored wire containing up to 20% silicon.

8. The method of claim 1 wherein the aluminum spray filler comprises a silicon cored wire containing about 20% silicon.

9. A method of providing a smooth paintable surface after aluminum joining comprising:

welding two aluminum pieces together to form a joint, a weld bead being formed at the joint;

roughening an area around the weld bead;

thermal spraying an aluminum spray filler on the area around the weld bead; and grinding the area around the weld bead and aluminum spray filler to produce a smooth paintable surface at the joint.

10. The method of claim 9 wherein the area around the weld bead is roughened by a process selected from grit blasting, rough sanding, and depositing a flux.

11. The method of claim 9 wherein the aluminum spray filler comprises a solid wire containing up to about 12% silicon.

12. The method of claim 9 wherein the aluminum spray filler comprises an aluminum alloy selected from 11xx or 4xxx series aluminum alloys.

13. The method of claim 9 wherein the aluminum spray filler is selected from 1100, 4047, and 4043 aluminum alloys.

14. The method of claim 9 wherein the aluminum spray filler comprises a silicon cored wire containing up to 20% silicon.

15. The method of claim 9 wherein the aluminum spray filler comprises a silicon cored wire containing about 20% silicon.

* * * * *